(12) United States Patent
Umezawa

(10) Patent No.: US 6,399,003 B1
(45) Date of Patent: Jun. 4, 2002

(54) PROCESS FOR MAKING MELT-SPUN SPANDEX

(75) Inventor: Masao Umezawa, Shiga (JP)

(73) Assignee: DuPont-Toray Co. Ltd., Tokyo (JP)

( * ) Notice: Subject to any disclaimer, the term of this patent is extended or adjusted under 35 U.S.C. 154(b) by 0 days.

(21) Appl. No.: 09/403,538

(22) PCT Filed: Sep. 3, 1998

(86) PCT No.: PCT/US98/18428

§ 371 (c)(1),
(2), (4) Date: Oct. 22, 1999

(87) PCT Pub. No.: WO99/11688

PCT Pub. Date: Mar. 11, 1999

(30) Foreign Application Priority Data

Sep. 3, 1997 (JP) .............................. 9-256144

(51) Int. Cl.[7] ........................ C08G 18/28; D01D 10/02; D01F 6/70
(52) U.S. Cl. ............... 264/176.1; 264/211.17; 528/59; 528/65; 528/80
(58) Field of Search ................. 264/176.1, 211.17; 528/59, 65, 80

(56) References Cited

U.S. PATENT DOCUMENTS 3,649,600 A * 3/1972 Harper et al. .................. 528/65
5,391,682 A * 2/1995 Ogawa et al. ................. 528/59

FOREIGN PATENT DOCUMENTS

CA     1321852 A * 8/1993
WO    WO-94/23100 A * 10/1994

OTHER PUBLICATIONS

Translation of Japan 4–146915–A (published May. 20, 1992).*
Translation of Japan 5–214062–A (published Aug. 24, 1993).*
Abstract of Japan 7–278246–A2 (published Oct. 24, 1995).*
Abstract of Japan 7–305226–A2 (published Nov. 21, 1995).*

* cited by examiner

Primary Examiner—Leo B. Tentoni

(57) ABSTRACT

A process for melt-spinning solution-polymerized polyurethanes, based on polvether glycols and MDI at an addition ratio of 1.8 to 6.0, glycol chain extenders and a chain terminator to produce number average molecular weights of the polyurethanes of 40,000–150,000, and 5–2500 decitex spandex made thereby, are provided.

7 Claims, No Drawings

PROCESS FOR MAKING MELT-SPUN SPANDEX

BACKGROUND OF THE INVENTION

1. Field of the Invention

The present invention concerns a method of melt-spinning polyurethanes into textile decitex spandex and, more particularly, a method using ethylene glycol chain extender in the preparation of the polyurethane.

2. Discussion of Background Art

Spandex based on polymeric glycols, diisocyanates, and aliphatic diols is known. Ethylene glycol has been disclosed as a chain extender for making thermoplastic polyurethane-based spandex, but its use in making melt-spun spandex leads to the difficulty in melt-spinning such polyurethanes. U.S. Pat. No. 3,649,600 discloses spandex based on poly(tetramethyleneether) glycol 1,1'-methylenebis(4-isocyanatobenzene) and 1,4-butane-diol, polymerized in a two-step melt-polymerization process in the presence of 0.06–0.3% by weight of water based on the polymeric glycol. Although fibers are prepared, the high softening point of the polyurethanes obtained is expected to give poor spinnability due to excessive cross-linking at the high temperature needed to melt-spin the polymers.

Japanese Published Patent Application 04-146915 and U.S. Pat. No. 5,391,682 disclose a two-step melt polymerization and melt spinning of high molecular weight, number average above 160,000, polyurethanes under special conditions of high shear and a total glycol to isocyanate ratio range of 0.95 to 1.05. The product polyurethane is said to contain up to 500 crystalline particles (clumps) per kilogram.

Japanese Published Patent Application 05-214062 discloses melt polymerization and melt spinning of 2G-extended polyurethanes under special conditions of high shear rates (at least 10,000 sec$^{-1}$) and very short residence times (60–300 seconds), without providing any examples using 2G, which can be used for pelletizing the large diameter strands. There is no disclosure of small-diameter textile fibers, whose manufacture makes more stringent demands on polymer quality.

There remains a need to be able to prepare polyurethanes based on ethylene glycol chain extender which can be reliably melt-spun into textile decitex fibers having useful properties.

SUMMARY OF THE INVENTION

The process of this invention for preparing melt-spun spandex comprises the steps of:

a) contacting in a solvent
   i) a polymeric glycol selected from the group consisting of poly(tetramethyleneether) glycol and poly(tetramethyleneether-co-3-methyltetramethyleneether) glycol having a number average molecular weight of 2400–8000,
   ii) 1,1'-methylenebis(4-isocyanatobenzene) at a molar addition ratio of polymeric glycol to isocyanate of 1.8–6.0:1 and
   iii) a chain extender selected from the group consisting of ethylene glycol, 1,3-propanediol, and 1,4-butanediol, to form a polyurethane;

b) adding a monofunctional chain terminator in order to obtain a polyurethane having a number average molecular weight 40,000–150,000 and a softening point of not more than 230° C.;

c) removing the solvent; and d) melt-spinning the polyurethane to form spandex.

DETAILED DESCRIPTION OF THE INVENTION

As used herein, the term "spandex" has its customary meaning, that is, a manufactured fiber in which the fiber-forming substance is a long chain synthetic elastomer comprised of at least 85% by weight of a segmented polyurethane. The segments in the polyurethane are classified into "soft" segments of polyether-urethane blocks and "hard" segments containing aromatic and urethane groups.

Suitable polymeric glycols include poly(1,4-tetramethyleneether glycol) (PO4G) and copolymers of tetrahydrofuran and 3-methyltetrahydrofuran (3MePO4G) having a number-average molecular weight of about 2400–8000. 3MePO4G having 4–20 mole percent 3-methyl moieties and a molecular weight of about 2400–4500 is preferred. When the molecular weight of polymeric glycol is less than 2400, the recovery properties of the resulting yarn tend to become low and it becomes difficult to obtain the desired elongation. When the molecular weight of the polymeric glycol exceeds 8000, the strength decreases and the resistance to chemicals declines. Use of the preferred 3MePO4G glycol gives spandex having a particularly good balance of mechanical properties.

The diisocyanate used in the process of this invention is 1,1'-methylenebis(4-isocyanatobenzene) (MDI). Other diisocyanates can be included in minor amounts, provided they do not compromise the advantageous effects of the invention.

The chain extender used in the method of the present invention is selected from the group consisting of ethylene glycol (abbreviated hereinafter as 2G), 1,3-propanediol (3G) and 1,4-butanediol (4G). 2G is preferred and presents the most demands on stable melt-spinning of polyurethanes prepared with it. This is because polyurethanes made with 2G have a high hard segment melting point (about 240° C.). The hard ratio (the molar ratio of 2G to polymeric glycol) is in the range of about 1.75 to 3.0. Other diol chain extenders can be included in minor amounts.

A monofunctional chain terminator is used in the process of the present invention to control the molecular weight of the polyurethane. For polyurethanes useful in melt-spinning spandex, this number average molecular weight is determined to be 40,000–150,000. Useful chain terminators include monoamines, monoalcohols and monoisocyanates. Aliphatic alcohols are preferred, and n-butanol is especially preferred. The chain terminator can be added at the beginning or the end of the polymerization. Addition at the end of the polymerization is preferred for more uniform molecular weight distribution.

Any suitable solvent can be used in the polymerization process of the present invention, such as dimethylacetamide ("DMAc"), dimethylformamide, dimethylsulfoxide, n-methylpyrrolidone, and mixtures thereof.

The ingredients for the solution polymerization can be added in one step or in two steps. In the one-step method, the polymeric glycol, MDI and diol chain extender are added substantially simultaneously. In the two-step method, the polymeric glycol and MDI are first mixed to allow the formation of an isocyanate-terminated prepolymer, after which the diol chain extender is added to form a polyurethane. The one-step method is preferred because of its simplicity and low cost. In the one-step method, good results can be obtained when the starting materials are added to the solution at a relatively low temperature (for example in the range of about 20° C.–30° C.), the temperature is raised to the reaction temperature (for example at least about 70° C.) and, once a preselected degree of polymerization has been reached, the chain terminator is added.

After the completion of the above steps, any suitable method can be used to remove the solvent from the polymer solution. Typically the solvent can be removed in a vacuum or with hot air, and, alternatively, the solution can be poured into steam or water. A devolatilizing extruder, such as that used in Canadian Patent 1,321,852, can also be used so that polyurethanes can be continuously polymerized and spun. Methods combining these approaches can also be used.

Polyurethane from which the solvent has been removed in this way can be generally processed into chips, flakes, particles and the like. Chips offer the advantage of being easy to transport, in addition to which any further required drying is easy. Because the resulting polyurethane is sometimes tacky, the addition of a suitable lubricant or antitack agent such as silicone oil, calcium stearate, sodium stearate, magnesium stearate, talc, barium sulfate, and the like can be useful. These lubricants and antitack agents can be added to the solution or during the course of solvent removal.

The polyurethane which has been desolvated in this way is optionally further dried as needed. Any conventional drying method can be employed without particular limitation as to either the drying conditions or the method. Particularly advantageous methods include vacuum drying and drying in heated dry nitrogen.

The solution polymerization process of the invention requires a molar ratio of diisocyanate to polymeric glycol (the "addition ratio") of about 1.8–6. The resulting polyurethane has a softening point of not more than about 230° C. (preferably not more than 220° C.) and a number average molecular weight of about 40,000–150,000. When the addition ratio is less than about 1.8, the melting point of the spandex is unsatisfactorily low, and when it exceeds about 6, the elongation of the spandex decreases too much and the hand of the spandex becomes hard. An addition ratio in the range of about 2.5–3.7 is preferred for improved properties such as high softening point, high recovery, and good heat settability. When the softening point exceeds 230° C., melt spinning becomes difficult to carry out and heat-settability decreases. When the number-average molecular weight is less than about 40,000, the strength and elongation tend to below and the yarn becomes fragile. When the molecular weight is greater than about 150,000, the elongation becomes low, and filter clogging can occur during melt-spinning.

The polyurethane that has been thus prepared is then melt-spun to form spandex. Any conventional melt spinning method can be employed.

The cross-section of the spandex of the present invention can be circular, flattened, or of any other suitable cross-section. The fiber decitex can be in the range of about 5–2500 dtex and preferably in the range of about 10–135 dtex. The spandex of this invention can comprise a single filament or two or more united filaments.

Various stabilizers, pigments and the like can be added to the polyurethane, even in the spinning step. Useful additives include light stabilizers and antioxidants such as hindered phenols, including 2,6-di-t-butyl-4-methylphenol and Sumilizer GA-80 (manufactured by Sumitomo Chemical Co., Ltd., Tokyo, Japan), benzotriazoles (e.g., various Tinuvins, made by Ciba Specialties), phosphorus-based chemicals (e.g., Sumilizer P-16, manufactured by Sumitomo), and amine-type chemicals (various Tinuvins); inorganic pigments such as titanium oxide, zinc oxide and carbon black; clay minerals such as montmorillonite; metallic soaps such as magnesium stearate; microbicides and deodorants such as silver, zinc and compounds thereof; lubricants such as silicones and mineral oils; and various antistatic agents such as barium sulfate, cerium oxide, betaine and phosphoric acid compounds. These additives can be added during the spinning step or in the polymerization step.

It is preferred that the fiber thus obtained be constant-length or relaxation heat-treated in an additional step in order to increase its elongation-at-break. It is more preferred that heat treatment be performed on relaxed fiber, during which the relaxation ratio (the ratio of feed roll rpm to takeup roll rpm during heat treatment) is not more than about 40%. Heat treatment can be carried out by treatment with dry heat or wet heat, for example by steam or an infrared heater. The heat-treatment temperature can vary according to the treatment medium, but is generally in the range from about 70° C. up to about 5° C. below the polyurethane softening point. When dry heat is used, the temperature is in the range from about 90° C. to about 10° C. below the polyurethane softening point. Such heat treatment can be carried out in the spinning step or in a later step and can be carried out in one step or in multiple steps.

The number-average molecular weight of the polyurethanes made by the method this invention was measured by gel permeation chromatography (GPC), using a polystyrene standard. "Softening point," as used herein, refers to the value measured by thermal mechanical analysis (TMA) of a dry film obtained by casting the polyurethane solution of the invention into a film which is then dried at 1200C. Polymer solution viscosity was determined in accordance with the general method of ASTM D1343-69 with a Model DV-8 Falling Ball Viscometer, (made by Duratech Corp., Waynesboro, Va.), operated at 40° C.

Mechanical properties of the spandex were measured by using an Instron 4502 tensile tester. Five-cm long fiber samples were extended to 300% elongation at a rate of 50 cm/min and allowed to relax. This cycle was repeated five times, and then the sample were held at 300% elongation for 30 seconds. "Stress relaxation ratio" was the percent reduction in stress after holding the sample at the final extended length for 30 seconds following the fifth 300% extension. The sample was subsequently allowed to fully relax from the extension.

The ratio of the sample length when the stress became zero following relaxation from extension to the length before extension was the "set ratio". Tenacity at break and elongation at break were, respectively, the elongation and stress when, in the above measurement procedure, the fiber was extended a sixth time until it broke.

The hysteresis ratio was the stress, measured at 200% extension on the stretch part of the fifth 0–300% stretch-and-relax cycle, divided by the stress at 200% extension on the relax part of the fifth cycle after the extended length had been held for 30 seconds and then released.

To determine the heat-setting percent, the fiber was treated in a free, unsecured state for 10 minutes with 100° C. steam, then treated in an unsecured state for 2 hours with boiling water, and then dried at room temperature for one day. The fiber was then extended 100%, treated with 115° C. steam for 1 minute, and subsequently treated with 130° C. air for 1 minute at the same degree of extension. Next, the fiber was left to stand at room temperature for one day, and the final length was measured. The heat setting percent was calculated as the final length divided by the length at 100% extension, multiplied by 100.

EXAMPLE 1

PO4G, number average molecular weight 3,000 (10 kg), MDI (2.65 kg) and 2G (0.44 kg) were added substantially simultaneously to 20 kg of DMAC with stirring. The temperature of the resulting solution was then raised to 70° C., and the heated solution was stirred with a mechanical paddle stirrer for 7 hours, followed by the addition of 66 grams of n-butanol. The solids content of the solution was 40 wt %. The addition ratio for this polyurethane was 3.18, the hard ratio was 2.13, and the number-average molecular weight was determined to be 80,000. When melt spun, the resulting fiber had good tenacity at break. The softening point of this polyurethane was about 200° C.

Next, stabilizing additives were incorporated into the polymer solution by conventional slurry addition and mixing so that the polyurethane fiber contained 2.0 wt % Methacrol® 2462B (a polymer of bis(4-isocyanatocyclohexyl)methane and 3-t-butyl-3-aza-l,5-pentanediol), 1.2 wt % Methacrol® 2390D (a condensation polymer of p-cresol and divinyl benzene), both products of E. I. du Pont de Nemours and Company, and a small amount of silicone oil. The viscosity of this polymer solution was 3,800 poise at 40° C.

This solution was extruded as strand onto a net conveyor, and the strand was sprayed with 120° C. steam and then with water, passed through a cutter, and rendered into chips which were then vacuum dried at 80° C. The chips were melted in a single-screw extruder, then metered with a gear pump and melt-spun through a spinneret into a spinning chimney through which a stream of cooling air was being passed. The speed ratio between the godet (feed) roller and the windup unit was 1.40, and the melt-spinning was carried out at 350 m/min. The resulting 13 decitex monofilament fiber was wound onto conventional cardboard tubes. The spinnability was good and free of any problems. The properties of this yarn are shown in the Table. Yarn having a high tenacity at break and a relatively high hysterisis ratio was obtained.

EXAMPLE 2

Poly(tetramethyleneether-co-3-methyltetramethyleneether) glycol, number average molecular weight 3,500 and a 3-methyltetramethylene-ether moiety content of 12.5 mole percent (10.5 kg), MDI (2.52 kg) and 2G (0.41 kg) were added substantially simultaneously to 20 kg of DMAC with stirring. The resulting solution was then raised to a temperature of 70° C. and reacted in the same way as in Example 1, followed by the addition of 0.2 wt % (based on total solution weight) of n-butanol. The solids content of the solution was 40%. The addition ratio for this polyurethane was calculated to be 3.3, and the hard ratio 2.20. The softening point of this polyurethane was about 200° C. The number average molecular weight was determined to be 70,000. When melt-spun, the resulting fiber had good tenacity at break. Next, an additive package was added as in Example 1, giving a solution whose viscosity was 4,100 poise at 40° C. This solution was then rendered into chips by the same method used in Example 1, which were also melt-spun as in Example 1. The speed ratio between the godet roller and the windup unit was 1.25, and melt-spinning was carried out at 450 m/min. The resulting 13 decitex monofilament fiber was wound onto conventional cardboard tubes. The spinnability was good and free of any problems.

The properties of this yarn are also shown in the Table. Yarn having good recovery properties (such as low set and stress relaxation ratios), high elongation at break , and low hysteresis ratio was obtained.

EXAMPLE 3

The yarn prepared in Example 2 above was fed by a feed roll through a 130° C. hollow (tunnel) heater, passed around a takeup roll at a relaxation ratio of 20%, and wound up. The residence time of the yarn in the heater was about one second. The properties of this yarn are also shown in the Table and show that an even higher elongation at break was obtained.

TABLE 1

|  | Ex. 1 | Ex. 2 | Ex. 3 |
| --- | --- | --- | --- |
| Softening point (° C.) | 200 | 200 | 200 |
| Elongation at break (%) | 350 | 410 | 480 |
| Tenacity at break (dN/tex) | 1.3 | 0.8 | 0.6 |
| Set Ratio | 1.26 | 1.20 | 1.23 |
| Stress relaxation ratio (%) | 33 | 24 | 27 |
| Heat setting (%) | 60 | 66 | 58 |
| Hysteresis ratio | 4.5 | 1.4 | 1.7 |

COMPARATIVE EXAMPLE 1

Using the same ratios of PO4G, MDI and 2G as in Example 1 but without the addition of the chain terminator n-butanol, melt polymerization was carried out in a twin screw extruder (model no. S2-5KRCVP kneader), made by Kurimoto Steel Company, Japan) at about 180° C., a shear rate of about 1000 sec$^{-1}$ and about 5 seconds residence time. The polymer melt was cloudy and discolored. Chips could not easily be made for melt-spinning, but a small amount of polymer grains was made by hand-cutting. During attempted melt-spinning these grains, the fiber curled and twisted just below the spinneret, and the fiber frequently broke during spinning.

COMPARATIVE EXAMPLE 2

Using the ratios of 3MePO4G, MDI and 2G as in Example 2 and, again, without the addition of n-butanol, polymerization was carried out as in Comparative Example 1, with the same results.

What is claim is:

1. A process for preparing melt-spun spandex comprising the steps of:
    a) contacting in a solvent
        i) a polymeric glycol selected from the group consisting of poly(tetramethyleneether) glycol and poly (tetramethyleneether-co-3-methyltetramethylene-ether) glycol having a number average molecular weight of 2400–8000,
        ii) 1,1'-methylenebis(4-isocyanatobenzene) at a molar addition ratio of polymeric glycol to isocyanate of 1.8–6.0:1 and
        iii) a chain extender selected from the group consisting of ethylene glycol, 1,3-propanediol, and 1,4-butanediol, to form a polyurethane;
    b) adding a monofunctional chain terminator in order to obtain a polyurethane having a number average molecular weight 40,000–150,000 and a softening point of not more than 230° C.;
    c) removing the solvent; and
    d) melt-spinning the polyurethane to form spandex.

2. The process of claim 1 wherein the chain extender is ethylene glycol, the chain terminator is an aliphatic alcohol, and the softening point is not more than 220° C.

3. The process of claim 2 wherein the polyurethane is formed in two steps by contacting the polymeric glycol with 1,1'-methylenebis(4-isocyanato-benzene) to form an isocyanate-terminated prepolymer and then contacting the prepolymer with the ethylene glycol.

4. The process of claim 2 wherein the polyurethane is formed in one step by adding the polymeric glycol, 1,1'-methylenebis(4-isocyanato-benzene) and ethylene glycol substantially simultaneously.

5. The process of claim 4 wherein the polymeric glycol, 1,1'-methylenebis(4-isocyanato-benzene), and ethylene glycol are mixed in a temperature range of 20° C.–30° C. and then heated to at least about 70° C. to form a polyurethane.

6. The process of claim 4 wherein the polymeric glycol is poly(tetramethyleneether-co-3-methyltetra-methyleneether) glycol having a number average molecular weight of 2400–4500 and a 3-methyltetra-methyleneether moiety content of 4–20 mole percent, and the addition ratio is 2.5–3.7.

7. The process of claim 1 comprising the additional step of heat-treating the spandex.

\* \* \* \* \*